US012597003B2

(12) United States Patent
Eivy et al.

(10) Patent No.: US 12,597,003 B2
(45) Date of Patent: Apr. 7, 2026

(54) COORDINATION AND MANAGEMENT OF DIGITAL ASSET ENDORSEMENTS

(71) Applicant: Disney Enterprises, Inc., Burbank, CA (US)

(72) Inventors: Adam D. Eivy, Vashon, WA (US); Dionysius Mavromatis, Kirkland, WA (US); Katharine S. Navarre, Los Angeles, CA (US); Christiaan A. Cokas, Chester, CT (US); Charles V. Pritchard, Seattle, WA (US)

(73) Assignee: Disney Enterprises, Inc., Burbank, CA (US)

( * ) Notice: Subject to any disclaimer, the term of this patent is extended or adjusted under 35 U.S.C. 154(b) by 99 days.

(21) Appl. No.: 17/960,085

(22) Filed: Oct. 4, 2022

(65) Prior Publication Data

US 2023/0107705 A1 Apr. 6, 2023

Related U.S. Application Data

(60) Provisional application No. 63/252,536, filed on Oct. 5, 2021.

(51) Int. Cl.
| | |
|---|---|
| *G06Q 20/12* | (2012.01) |
| *G06Q 20/38* | (2012.01) |
| *G06Q 50/00* | (2012.01) |

(52) U.S. Cl.
CPC ..... *G06Q 20/1235* (2013.01); *G06Q 20/3829* (2013.01); *G06Q 50/01* (2013.01); *G06Q 2220/00* (2013.01)

(58) Field of Classification Search
CPC ........... G06Q 20/1235; G06Q 20/3829; G06Q 50/01; G06Q 2220/00
See application file for complete search history.

(56) References Cited

U.S. PATENT DOCUMENTS

| | | | |
|---|---|---|---|
| 11,348,152 B1 | 5/2022 | Davis | |
| 2015/0348017 A1* | 12/2015 | Allmen | G06Q 20/367 705/76 |
| 2016/0321434 A1* | 11/2016 | McCoy | G06Q 20/123 |

(Continued)

OTHER PUBLICATIONS

Ziuyan Wang et al., ArtChain: Blockchain-Enabled Platform for Art Marketplace, Jul. 1, 2019, IEEE, pp. 447-454 (Year: 2019).*

(Continued)

*Primary Examiner* — Nilesh B Khatri
(74) *Attorney, Agent, or Firm* — Farjami & Farjami LLP

(57) ABSTRACT

A system includes a hardware processor and a memory storing software code. The hardware processor is configured to execute the software code to receive a request to track exercises of one or more right(s) associated with a digital asset p using a private key of an endorser of the digital asset, obtain the digital asset including an endorsement in the form of a cryptographically unique identifier referencing a public key corresponding to the private key and associated with a public persona of the endorser, and verify, using the public key, a present ownership of the digital asset. The hardware processor is further configured to execute the software code to track each of the exercises of the right(s), and identify, based on a smart contract governing the exercise(s) of the right(s), a respective fee for each of the exercises of the right(s).

20 Claims, 5 Drawing Sheets

(56) References Cited

U.S. PATENT DOCUMENTS

| | | | | |
|---|---|---|---|---|
| 2017/0116693 A1* | 4/2017 | Rae | ...................... | G06Q 50/184 |
| 2017/0214522 A1* | 7/2017 | Code | ...................... | G06F 21/64 |
| 2017/0249606 A1* | 8/2017 | Pirooz | .................... | G06Q 40/02 |
| 2018/0041571 A1* | 2/2018 | Rogers | ................. | H04L 67/104 |
| 2018/0218176 A1* | 8/2018 | Voorhees | .............. | G06Q 20/02 |
| 2019/0080406 A1* | 3/2019 | Molinari | ............... | G06Q 40/02 |
| 2020/0005284 A1* | 1/2020 | Vijayan | ................ | G06Q 20/065 |
| 2020/0272713 A1 | 8/2020 | Black | | |
| 2021/0377052 A1* | 12/2021 | Brown | .................. | H04L 9/3239 |
| 2022/0058630 A1 | 2/2022 | Yantis et al. | | |
| 2022/0069996 A1 | 3/2022 | Xue et al. | | |
| 2022/0122050 A1* | 4/2022 | Pacella | ................. | H04L 63/108 |
| 2022/0271915 A1* | 8/2022 | Turner | ................. | H04L 9/3247 |
| 2023/0045546 A1* | 2/2023 | Kim | ...................... | H04L 9/3265 |
| 2023/0104103 A1* | 4/2023 | Eby | ........................... | H04L 9/50 |
| | | | | 705/69 |

OTHER PUBLICATIONS

"How It Works" May 19, 2020 https://stormbirdlabs.notion.site/
How-It-Works-ce0b1af2fe404d32888ed773c2453fc7 4 Pgs.
Nelson Aguilar "How to turn your NFT into a verified profile picture
on Twitter" Jan. 24, 2022 5 Pgs.
Clyde F. Smith "NFT Signatures Bring the Human Touch to Digital
Collectibles" Aug. 13, 2021 5 Pgs.

* cited by examiner

Fig. 4

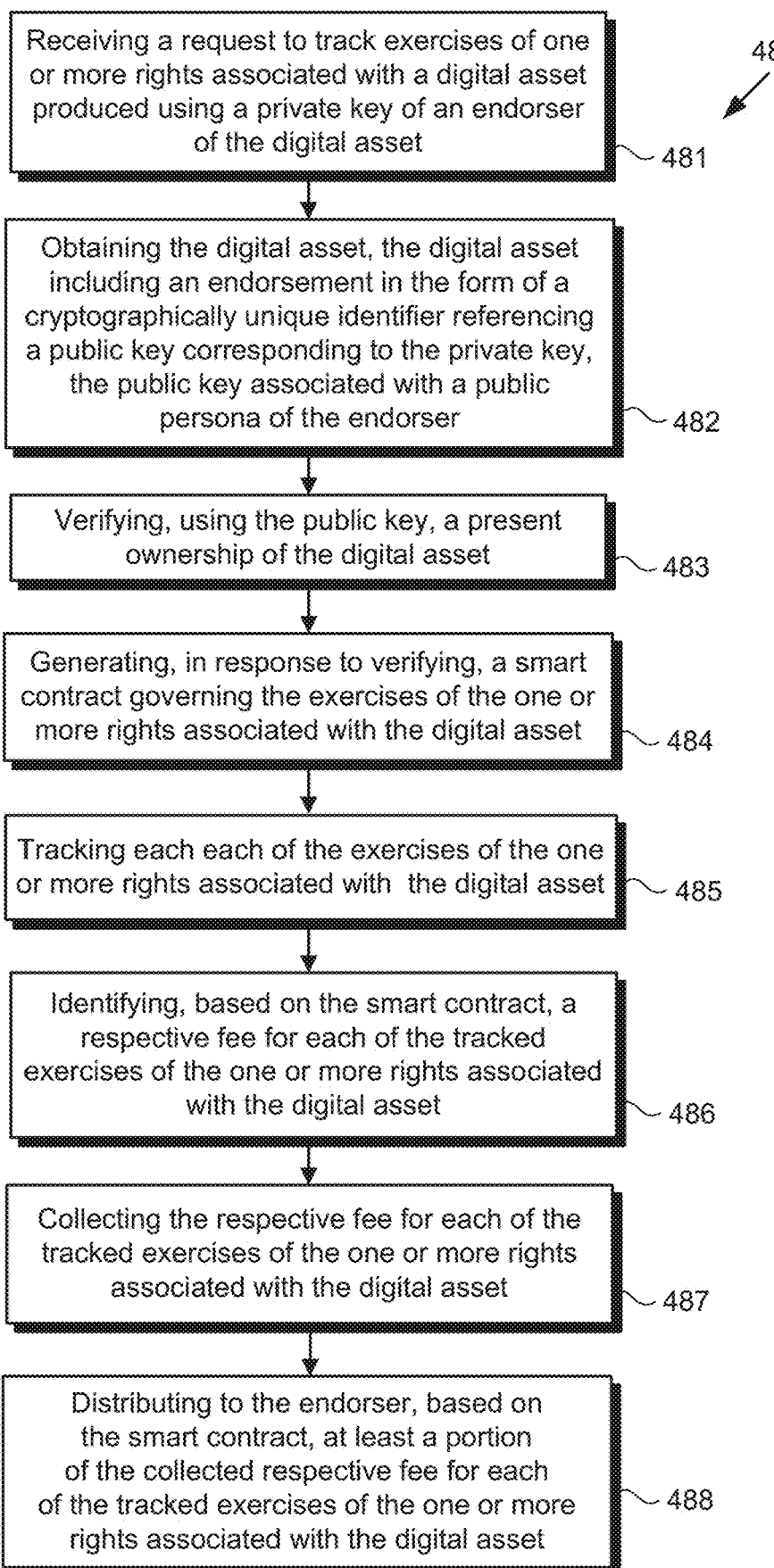

480

Receiving a request to track exercises of one or more rights associated with a digital asset produced using a private key of an endorser of the digital asset — 481

Obtaining the digital asset, the digital asset including an endorsement in the form of a cryptographically unique identifier referencing a public key corresponding to the private key, the public key associated with a public persona of the endorser — 482

Verifying, using the public key, a present ownership of the digital asset — 483

Generating, in response to verifying, a smart contract governing the exercises of the one or more rights associated with the digital asset — 484

Tracking each each of the exercises of the one or more rights associated with the digital asset — 485

Identifying, based on the smart contract, a respective fee for each of the tracked exercises of the one or more rights associated with the digital asset — 486

Collecting the respective fee for each of the tracked exercises of the one or more rights associated with the digital asset — 487

Distributing to the endorser, based on the smart contract, at least a portion of the collected respective fee for each of the tracked exercises of the one or more rights associated with the digital asset — 488

COORDINATION AND MANAGEMENT OF DIGITAL ASSET ENDORSEMENTS

RELATED APPLICATIONS

The present application claims the benefit of and priority to a pending Provisional Patent Application Ser. No. 63/252,536 filed on Oct. 5, 2021, and titled "NFT Endorsement Coordination and Management," which is hereby incorporated fully by reference into the present application.

BACKGROUND

Obtaining the endorsement of a celebrity, other type of famous person or entity can be challenging. For example, having an item autographed requires proximity in a physical space, and the endorsing party must either manually sign each item, use a reproducible stamp to mark it, or have a proxy reproduce their signature. For digital signatures, the industry standard is presently a transparent copy of a physical signature overlaid on an image or document, placing the signature style at risk of forgery. Thus, existing approaches to applying a physical or digital endorsement to an item or digital asset are inconvenient in that the existing approaches are manually demanding, difficult to authenticate, or both.

BRIEF DESCRIPTION OF THE DRAWINGS

FIG. 4 shows a flowchart presenting an exemplary method for coordinating and managing digital asset endorsements, according to one implementation.

DETAILED DESCRIPTION

Figure 1:
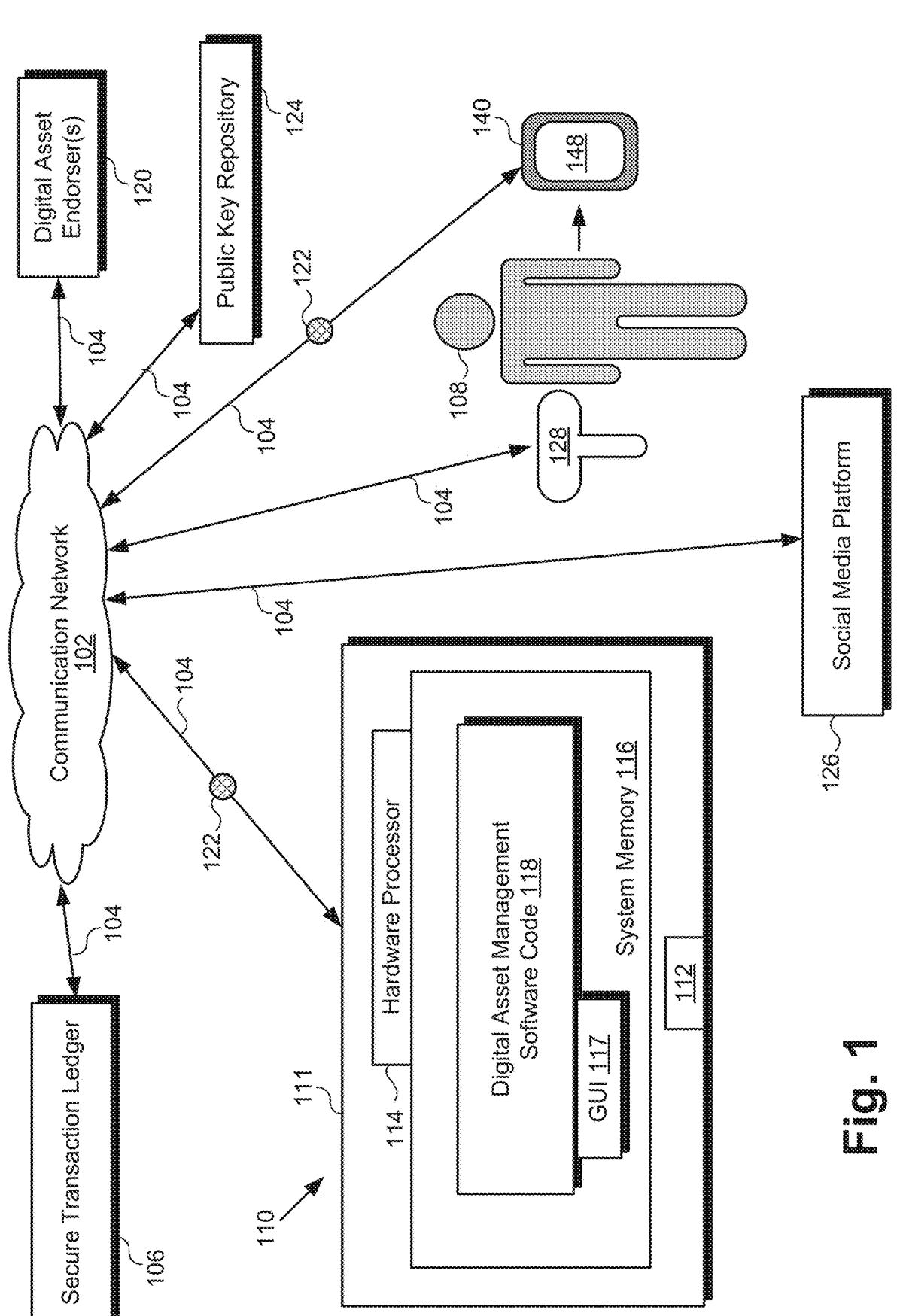
FIG. 1 shows a system for coordinating and managing digital asset endorsements, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The technology known as a non-fungible token (NFT) is allowing individual artists and companies to sell ownership rights to a digital asset, such as a file containing a photo or other image, video, audio, or any other desirable digital representation of a real or virtual object. An NFT is itself a digital asset in the form of a unit of data stored on a secure digital ledger, such as a blockchain for example, that certifies the contents of a digital file to be unique and therefore non-fungible. An NFT can be used to represent a digital content which is typically stored in and accessible via the cloud, and confer ownership of that digital content to an individual or entity. However, in contrast to traditional ownership rights, ownership of an NFT does not prevent others from accessing, or even copying, the digital content associated with the NFT. That is to say, an NFT confers ownership of digital content that is separate from copyright.

The present application discloses systems and methods for coordinating and managing endorsements of NFTs or other digital assets that address and overcome the deficiencies in the conventional art. As noted above, obtaining the endorsement of a celebrity, other type of famous person or entity can be challenging. For example, having an item autographed requires proximity in a physical space, and the endorsing party must either manually sign each item, use a reproducible stamp to mark it, or have a proxy reproduce their signature. For digital signatures, the industry standard is presently a transparent copy of a physical signature overlaid on an image or document, placing the signature style at risk of forgery. Thus, existing approaches to applying a physical or digital endorsement to an item or digital asset are inconvenient in that the existing approaches are manually demanding, difficult to authenticate, or both.

The digital asset endorsement coordination and management solution disclosed in the present application utilizes verified cryptocurrency wallets, and introduces a novel and inventive automated process for digital asset transferal making it possible to execute a cryptographic signature process from a celebrity wallet in the midst of an NFT or other digital asset transaction, thereby advantageously adding an instantly verifiable and cryptographically secure signature to any NFT asset.

It is noted that, as defined in the present application, the term "NFT asset" may refer to any digital asset having its ownership certified by an NFT. Examples of a digital asset may include an NFT itself, or a digital file containing an image or images, video without audio, audio without video, or audio-video (AV) content, such as all or part of a television (TV) episode, movie, or video game, to name a few. In addition, or alternatively, in some implementations, a digital asset may be or include a digital representation of persons, fictional characters, locations, objects, and identifiers such as brands and logos, for example, which populate a virtual reality (VR), augmented reality (AR), or mixed reality (MR) environment. Such digital representations may depict virtual worlds that can be experienced by any number of users synchronously and persistently, while providing continuity of data such as personal identity, user history, entitlements, possessions, payments, and the like. Moreover, in some implementations, a digital asset may be a hybrid of traditional audio-video and fully immersive VR/AR/MR experiences, such as interactive video.

It is further noted that the term cryptocurrency wallet or "digital wallet" may refer to any secure software application assigned to a creator or owner of a digital asset that stores the digital asset credentials (e.g., public and private keys, certifying ownership of the digital asset), and enables the NFT or other digital asset creator or owner to reassign, i.e., sell or otherwise transfer ownership of the digital asset to another person or entity. With respect to NFT assets, it is also noted that the relationship between an NET asset and a digital wallet is many-to-one rather than one-to-one. That is to say, in some implementations, the same digital wallet may store NFT credentials for each of multiple NFT assets. However, the NFT credentials of an NFT asset are uniquely present in only one digital wallet at a time.

FIG. 1 shows system 110 for coordinating and managing endorsements of digital assets, according to one exemplary implementation. As shown in FIG. 1, system 110 includes digital asset platform 111, transceiver 112, hardware processor 114, and system memory 116 implemented as a computer-readable non-transitory storage medium. According to the present exemplary implementation, system memory 116 stores digital asset management software code 118 providing graphical user interface (GUI) 117. In addition, FIG. 1 shows digital asset collector 108, who may act as a buyer or seller of NFTs or other digital assets, client device 140 utilized by digital asset collector 108 and having display 148, and optional electronic device 128 usable by digital asset collector 108. As further shown in FIG. 1, system 110 is utilized in a use environment including communication network 102, secure transaction ledger 106, one or more digital asset endorsers 120 (hereinafter "endorser(s) 120"), public key repository 124, and social media platform 126. Also shown in FIG. 1 is endorsed digital asset 122, as well as communication links 104 communicatively coupling system 110 to client device 140, endorser(s) 120, public key repository 124, social media platform 126, secure transaction ledger 106, and optionally to electronic device 128.

It is noted that endorser(s) 120 may include any person, or an entity such as a business or professional organization, sports team, or academic institution, to name a few examples. Moreover, in some use cases, endorser(s) 120 may include fictional personas corresponding to movie characters, animations, or culturally iconic representations (e.g., a person dressed as or otherwise representing a fictional persona in a real world environment).

With respect to the depiction of system 110 shown in FIG. 1, it is noted that although digital asset management software code 118 is depicted as being stored in system memory 116 for conceptual clarity, more generally, system memory 116 may take the form of any computer-readable non-transitory storage medium. The expression "computer-readable non-transitory storage medium," as used in the present application, refers to any medium, excluding a carrier wave or other transitory signal that provides instructions to hardware processor of a computing platform, such as hardware processor 114 of digital asset platform 111. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts digital asset management software code 118 as being entirely located in a single instance of system memory 116, that representation is also merely provided as an aid to conceptual clarity. More generally, system 110 may include one or more computing platforms, such as computer servers for example, which may be co-located, or may form an interactively linked but distributed system, such as a cloud-based system, for instance. As a result, hardware processor 114 and system memory 116 may correspond to distributed processor and memory resources of system 110. Thus, it is to be understood that various software modules of digital asset management software code 118 may be stored remotely from one another within the distributed memory resources of system 110.

Hardware processor 114 may include multiple hardware processing units, such as one or more central processing units, one or more graphics processing units, one or more tensor processing units, one or more field-programmable gate arrays (FPGAs), and an application programming interface (API) server, for example. By way of definition, as used in the present application, the terms "central processing unit" (CPU), "graphics processing unit" (GPU), and "tensor processing unit" (TPU) have their customary meaning in the art. That is to say, a CPU includes an Arithmetic Logic Unit (ALU) for carrying out the arithmetic and logical operations of digital asset platform 111, as well as a Control Unit (CU) for retrieving programs, such as digital asset management software code 118, from system memory 116, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

In some implementations, digital asset platform 111 may correspond to one or more web servers, accessible over a packet-switched network such as the Internet, for example. Alternatively, digital asset platform 111 may correspond to one or more computer servers supporting a private wide area network (WAN), local area network (LAN), or included in another type of limited distribution or private network. However, in some implementations, system 110 may be implemented virtually, such as in a data center. For example, in some implementations, system 110 may be implemented in software, or as virtual machines. Moreover, in some implementations, communication network 102 may be a high-speed network suitable for high performance computing (HPC), for example a 10 GigE network or an Infiniband network.

Transceiver 112 of system 110 may be implemented as a wireless communication unit configured for use with one or more of a variety of wireless communication protocols. For example, transceiver 112 may be implemented as a fourth generation (4G) wireless transceiver, or as a 5G wireless transceiver. In addition, or alternatively, transceiver 112 may be configured for communications using one or more of Wireless Fidelity (Wi-Fi), Worldwide Interoperability for Microwave Access (WiMAX), Bluetooth, Bluetooth low energy, ZigBee, radio-frequency identification (RFID), near-field communication (NFC), and 60 GHz wireless communications methods.

System 110 may be configured to produce digital assets, to produce and warehouse digital assets, or to distribute or warehouse digital assets created by others. Secure transaction ledger 106 may take the form of a public or private secure transaction ledger. Examples of such secure transaction ledgers may include Blockchain, Hashgraph, Directed Acyclic Graph (DAG), and Holochain ledgers, to name a few. In use cases in which secure transaction ledger 106 is a blockchain ledger, it may be advantageous or desirable to implement secure transaction ledger 106 to utilize a consensus mechanism having a proof-of-stake (PoS) protocol, rather than the more energy intensive proof-of-work (PoW) protocol. Although secure transaction ledger 106 is shown to be remote from system 110 in FIG. 1, such as a cloud-based or distributed secure transaction ledger, that implementation is merely exemplary. In other implementations, secure transaction ledger 106 may be stored in system memory 116 and may be controlled by system 110.

Figure 2:
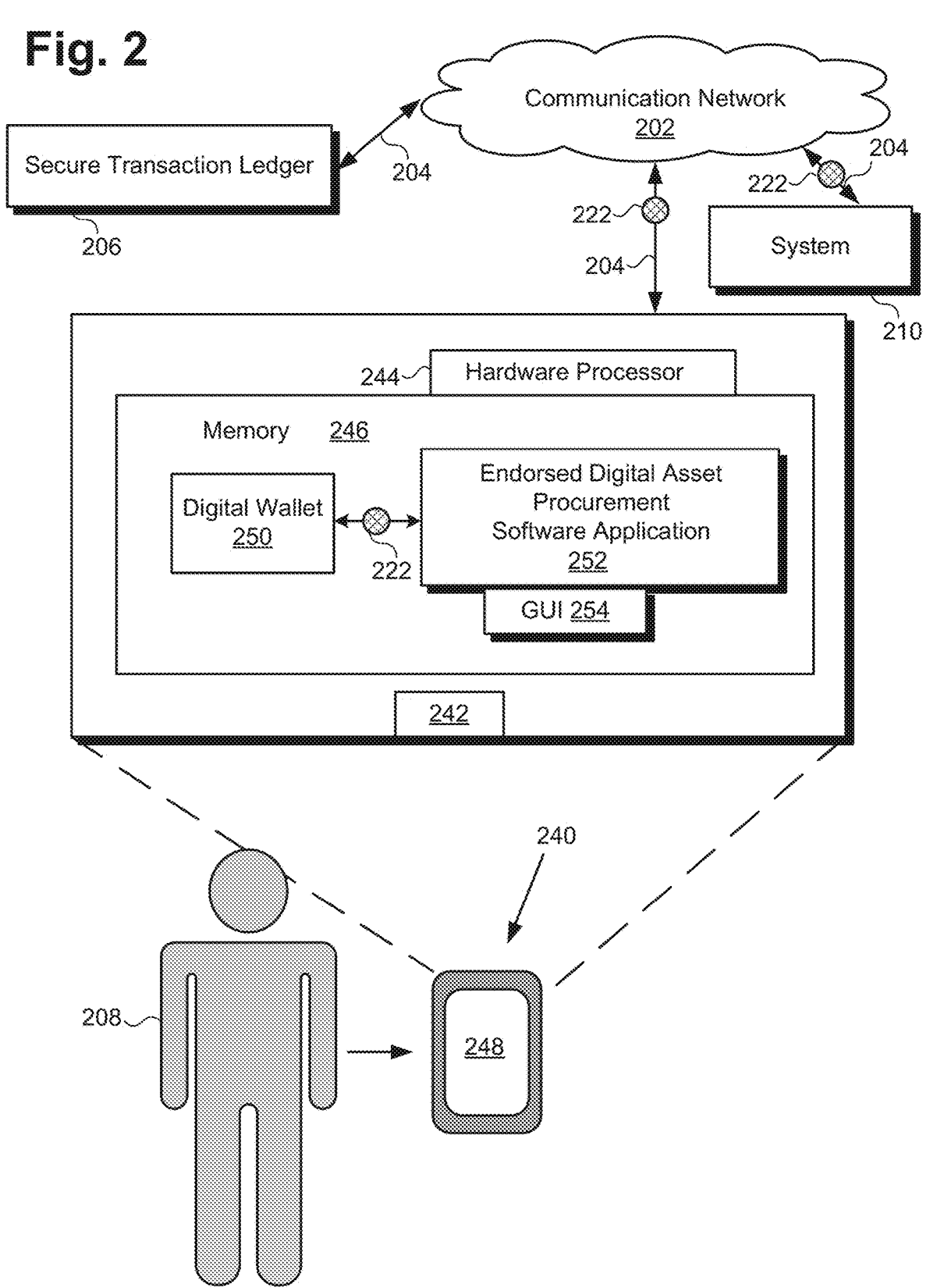
FIG. 2 shows a client device configured to mediate collection and transfer of ownership of one or more endorsed digital assets, according to one implementation.

FIG. 2 shows client device 240 of digital asset collector 208, configured to mediate collection and transfer of ownership of one or more digital assets, including endorsed digital asset 222, according to one implementation. As shown in FIG. 2, client device 240 includes transceiver 242, hardware processor 244, display 248, and memory 246 implemented as a computer-readable non-transitory storage medium storing NFT wallet 250 and endorsed digital asset procurement software application 252 providing GUI 254. Also shown in FIG. 2 are system 210, communication network 202, network communication links 204, and secure transaction ledger 206.

Although client device 240 is shown as a smartphone in FIG. 1 that representation is provided merely as an example. More generally, client device 240 may be any suitable mobile or stationary computing device or system that implements data processing capabilities sufficient to provide GUI 254, support connections to communication network 202, and implement the functionality ascribed to client device 240 herein. For example, in other implementations, client device 240 may take the form of a desktop computer, laptop computer, tablet computer, smart TV, a smart wearable device, such as a smartwatch for example, or an AR or VR device.

Transceiver 242 may be implemented as a wireless communication unit configured for use with one or more of a variety of wireless communication protocols. For example, transceiver 242 may be implemented as a 4G wireless transceiver, or as a 5G wireless transceiver. In addition, or alternatively, transceiver 242 may be configured for communications using one or more of Wi-Fi, WiMAX, Bluetooth, Bluetooth low energy, ZigBee, RFID, NFC, and 60 GHz wireless communications methods.

With respect to display 248 of client device 240, display 248 may be physically integrated with client device 240 or may be communicatively coupled to but physically separate from client device 240. For example, where client device 240 is implemented as a smartphone, laptop computer, or tablet computer, display 248 will typically be integrated with client device 240. By contrast, where client device 240 is implemented as a desktop computer, display 248 may take the form of a monitor separate from client device 240 in the form of a computer tower. Furthermore, display 248 of client device 240 may be implemented as a liquid crystal display (LCD), a light-emitting diode (LED) display, an organic light-emitting diode (OLED) display, a quantum dot (QD) display, or any other suitable display screen that performs a physical transformation of signals to light.

Endorsed digital asset procurement software application 252 may be configured to initiate a secure and authorized communication session in order to receive or transmit endorsed digital asset 222, enable digital asset collector 208 to acquire or sell endorsed digital asset 222 by providing inputs to GUI 254. According to the exemplary implementation shown in FIG. 2, digital wallet 250 can store NFT(s) or other digital assets on client device 240. However, in other implementations, digital wallet 250 may not be resident on client device 240, but may be a virtual wallet remote from client device 240, such as a cloud-based virtual wallet accessible to client device 240 via communication network 202 and network communication links 204. In yet other implementations, digital wallet 250 may be a hardware cryptocurrency wallet, such as a Ledger Nano S® device or the like.

System 210, endorsed digital asset 222, communication network 202, network communication links 204, and secure transaction ledger 206 correspond respectively in general to system 110, endorsed digital asset 122, communication network 102, network communication links 104, and secure transaction ledger 106, in FIG. 1. Thus, system 210, endorsed digital asset 222, communication network 202, network communication links 204, and secure transaction ledger 206 may share any of the characteristics attributed to respective system 110, endorsed digital asset 122, communication network 102, network communication links 104, and secure transaction ledger 106 by the present disclosure, and vice versa. Thus, although not shown in FIG. 2, like system 110, system 210 is communicatively coupled to features corresponding to endorser(s) 120, public key repository 124, and social media platform 126 via communication network 202 and network communication links 204.

Moreover, digital asset collector 208 and client device 240, in FIG. 2, correspond respectively in general to digital asset collector 108 and client device 140, in FIG. 1, and those corresponding features may share any of the characteristics attributed to either corresponding feature by the present disclosure. That is to say, although not shown in FIG. 1. In addition to display 148, client device 140 may include features corresponding respectively to transceiver 242, hardware processor 244, and memory 246 storing NFT wallet 250 and endorsed digital asset procurement software application 252 providing GUI 254.

Figure 3A:
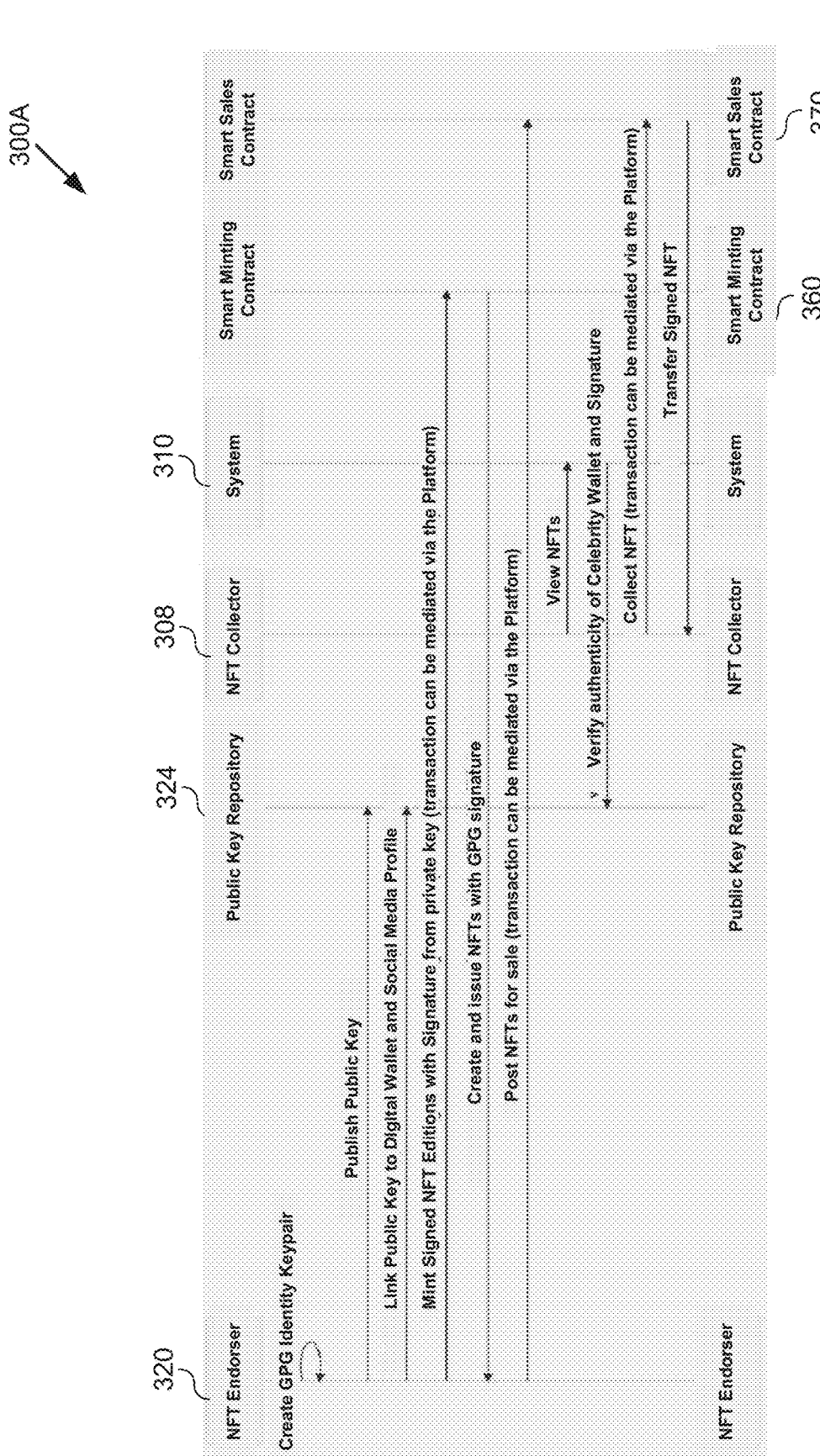
FIG. 3A shows a swimlane diagram depicting a process for coordinating and managing digital asset endorsements, according to one implementation.

FIG. 3A shows swimlane diagram 300A depicting a process for coordinating and managing endorsements of digital assets, according to one implementation, for the exemplary use case in which the digital assets are NFTs. Swimlane diagram 300A identifies NFT collector 308, system 310, endorser 320, public key repository 324, smart minting contract 360, and smart sales contract 370. It is noted that NFT collector 308 and system 310 correspond respectively in general to digital asset collector 108/208 and system 110/210 in FIGS. 1 and 2, while endorser 320 corresponds in general to endorser(s) 120 in FIG. 1. Thus, NFT collector 308 and system 310 may share any of the characteristics attributed to respective digital asset collector 108/208 and system 110/210 by the present disclosure, and vice versa, while endorser 320 may share any of the characteristics attributed to endorser(s) 120 herein.

According to the exemplary process outlined in FIG. 3A, endorser 320 creates an encryption key pair, such as a Gnu Privacy Guard (GPG) encryption key pair for example, and publishes the public key to public key repository 324. Endorser 320 then links that public key to their digital wallet and to their verifiable social media profile on social media platform 126, in FIG. 1. Subsequently, endorser 120/320 interacts with smart minting contract 360 generated by digital asset management software code 118, executed by hardware processor 114 of system 110/310, which mints endorsed editions of an existing NFT with an added endorsement, such as a digital signature, or a digital representation of a trademark, logo, or brand for example, using the private key of endorser 120/320. Endorsed digital asset 122 in the form of an endorsed NFT (hereinafter also "endorsed NFT 122") is then produced (i.e., minted in the case of an NFT) and posted for sale by system 110/310 using smart sales contract 360 generated by digital asset management software code 118, executed by hardware processor 114. This enables NFT collector 308 to view and select endorsed NFT 122 for purchase.

Once NFT collector 308 decides to purchase endorsed NFT 122, hardware processor 114 of system 110/310 executes digital asset management software code 118 to verify the authenticity of the endorsement of endorsed NET 122 and the digital wallet of endorser 120/320 using the verifiable social media profile of endorser 120/320 on social media platform 126, and collects endorsed NFT 122. When payment for endorsed NFT 122 has been remitted by NFT collector 308, hardware processor 114 of system 110/310 executes digital asset management software code 118 to transfer endorsed NFT 122 to digital wallet 250 of NFT collector 308, shown in FIG. 2, and the sales transaction is posted to secure transaction ledger 106/206.

It is noted that, in some use cases, NFT collector 308 may be in attendance at a venue devoted to a particular celebrity endorser, such as an actor, athlete, or fictional character persona and may wish to obtain an NFT autographed (i.e., endorsed) by that celebrity endorser. Electronic device 128 and client device 140/240 advantageously make it possible for NFT collector 308 to obtain that autographed NFT (i.e., endorsed NFT 122) in a touchless manner, by tapping or otherwise activating electronic device 128, or by using endorsed digital asset procurement software application 252 resident on client device 140/240, to initiate a transaction via system 110/210/310. It is noted that, in various implementations, electronic device 128 may take the form of key type fob or a wearable device such as a bracelet or pin, for example, and may include a wireless communication unit configured for use with one or more of a variety of wireless communication protocols. For instance, electronic device 128 may include as a 4G wireless transceiver and/or as a 5G wireless transceiver. In addition, or alternatively, electronic device 128 may be configured for communications using one or more of Wi-Fi, WiMAX, Bluetooth, Bluetooth low energy, ZigBee, RFID, NFC, and 60 GHz wireless communications methods.

Figure 3B:
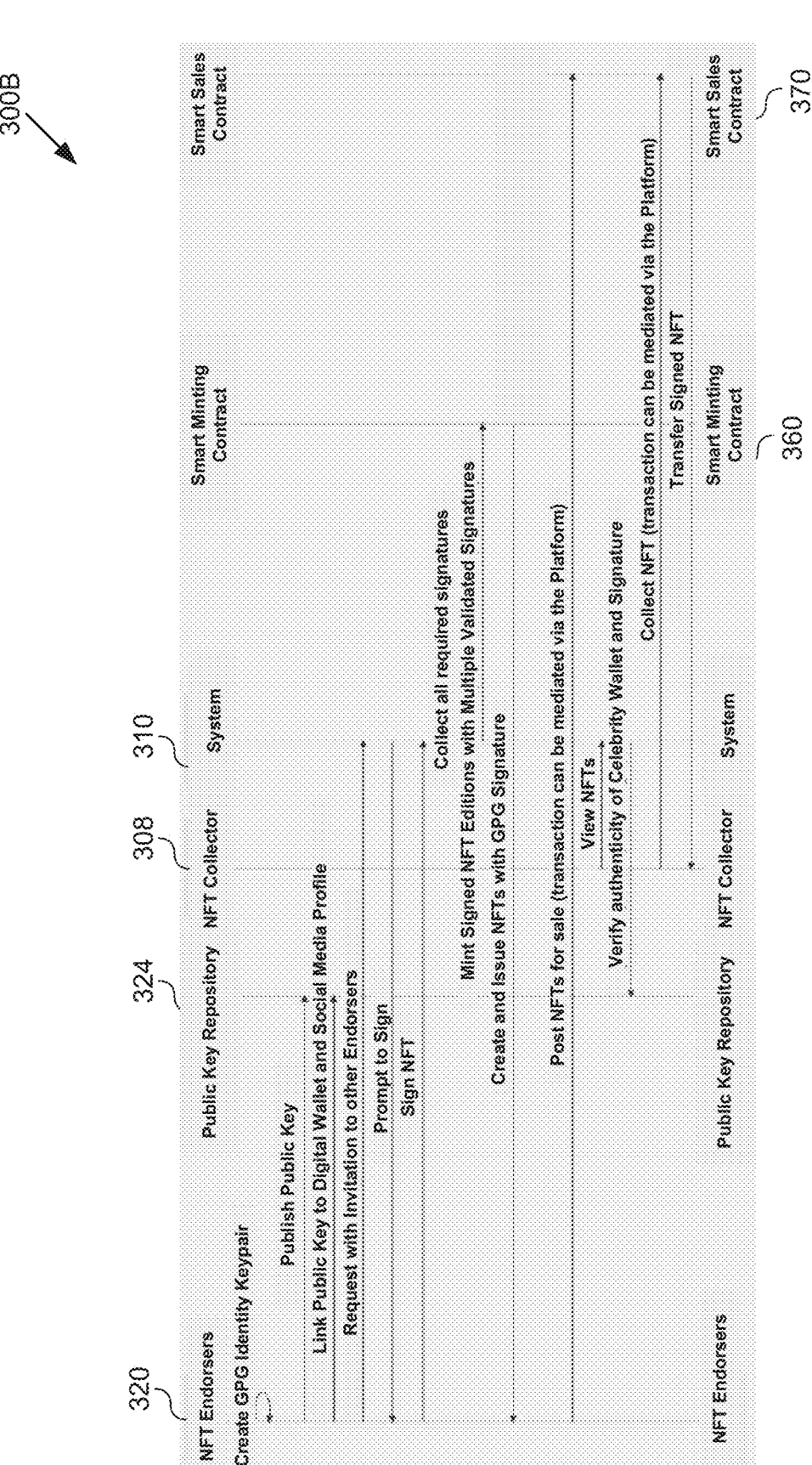
FIG. 3B shows a swimlane diagram depicting a process for coordinating and managing digital asset endorsements, according to another implementation.

FIG. 3B shows swimlane diagram 300B depicting a process for coordinating and managing NFT endorsements, according to another implementation. It is noted that any feature in FIG. 3B identified by a reference number identical to that shown in FIG. 3A corresponds to that previously described feature and may share any of the characteristics attributed to it above. The process depicted in FIG. 3B differs from that in FIG. 3A in that multiple endorsements are applied to a single NFT. Thus, as shown by diagram 300B, system 310 acts as an aggregator of the multiple endorsements provided by endorsers 320, in addition to the functionality attributed to system 310 above by reference to FIG. 3A.

According to the exemplary process outlined in FIG. 3B, each of endorsers 320, as well as in some use cases, a collective group representative of endorsers 320, such as a sports team for instance, creates an encryption key pair, such as a GPG encryption key pair for example, and publishes the public key to public key repository 324. Endorsers 320 then link that public key to their respective digital wallets and to their verifiable social media profile on social media platform 126, in FIG. 1. System 110/310 then receives a request identifying all endorsers 120/320 to be invited to provide their respective endorsements, prompts endorsers 120/320 to provide their respective endorsements, and collects the signature or other endorsement of each of endorsers 120/320. Subsequently, endorsers 120/320 interact with smart minting contract 360 generated by digital asset management software code 118, executed by hardware processor 114 of system 110/310, which mints endorsed editions of an existing NFT with added endorsements by each of endorsers

120/320, such as their individual signatures for example, using the respective private keys of each of endorsers 120/320. Endorsed NFT 122 is then minted and posted for sale by system 110/310 using smart sales contract 360 generated by digital asset management software code 118, executed by hardware processor 114. This enables NFT collector 308 to view and select endorsed NFT 122 for purchase.

Once NFT collector 308 decides to purchase endorsed NFT 122, hardware processor 114 of system 110/310 executes digital asset management software code 118 to verify the authenticity of the endorsements of endorsed NFT 122 and the digital wallets of each of endorsers 120/320 using the respective verifiable social media profile of each of endorsers 120/320 on social media platform 126, and collects endorsed NFT 122. When payment for endorsed NFT 122 has been remitted by NFT collector 308, hardware processor 114 of system 110/310 executes digital asset management software code 118 to transfer endorsed NFT 122 to NFT digital wallet 250 of NFT collector 308, shown in FIG. 2, and the sales transaction is posted to secure transaction ledger 106/206.

It is noted that although FIGS. 3A and 3B are described above by reference to specific use cases in which endorsements in the form of a signature or signatures are applied to an NET that representation is provided merely by way of example. In other use cases, the endorsement carried by endorsed NFT 122 may be any endorsed digital asset 122, and the endorsement carried by endorsed digital asset 122 may be any cryptographically unique digital identifier.

It is further noted that the present novel and inventive concepts have more general applicability than the provision of endorsed NFTs. For instance, system 110/210/310 may be adapted to serve as a standardized universal asset library, which may be decentralized or distributed. In such an implementation, system 110/210/310, functioning as an open exchange, may be configured to verify the authenticity of a two-dimensional (2D) or three-dimensional (3D) digital asset owned by an advertiser or content creator and available from system 110/210/310, by requiring a signed edition of the digital asset minted via a digital wallet linked to a verified social media profile. Hardware processor 114 of system 110/210/310 may then execute digital asset management software code 118 to track the ownership and usage of the digital asset and pay or charge royalties for different kinds of use depending on a predetermined royalty schedule.

The functionality of system 110/210/310 will be further described below with reference to FIG. 4. FIG. 4 shows flowchart 480 presenting an exemplary method for coordinating and managing endorsements of digital assets, such as NFTs or NFT assets for example, according to one implementation. With respect to the method outlined by FIG. 4, it is noted that certain details and features have been left out of flowchart 480 in order not to obscure the discussion of the inventive features in the present application.

Referring to FIG. 4 with further reference to FIGS. 1, 2, 3A, and 3B, flowchart 480 includes receiving a request to track exercises of one or more rights associated with a digital asset produced using a private key of endorser(s) 120/320 of the digital asset (action 481). Action 481 may be performed by digital asset management software code 118, executed by hardware processor 114 of system 110/210/310. It is noted that the one or more rights associated with the digital asset may be a right of ownership, a temporary usage right, an advertising right, or a licensing right, to name a few examples. Moreover, and as noted above, the digital asset itself may be an NFT, or may be an NFT asset, i.e., a digital asset having its ownership certified by an NFT. By way merely of example, where the right being tracked is a right of ownership by an owner of an NFT, the exercise of that right may be a sale of the right of ownership to the NFT to a purchaser, such as NFT collector 108/208/308.

As further noted above, examples of such a digital asset may include a digital file containing a 2D or 3D image or images, video without audio, audio without video, or AV content, such as all or part of a TV episode, movie, or video game, to name a few. In addition, or alternatively, in some implementations, such a digital asset may be or include a digital representation of persons, fictional characters, locations, objects, and identifiers such as brands and logos, for example, which populate a VR, AR, or MR environment. Those digital representations may depict virtual worlds that can be experienced by any number of users synchronously and persistently, while providing continuity of data such as personal identity, user history, entitlements, possessions, payments, and the like. Moreover, in some implementations, such a digital asset may be a hybrid of traditional audio-video and fully immersive VR/AR/MR experiences, such as interactive video.

Continuing to refer to FIG. 4 in combination with FIGS. 1, 2, 3A, and 3B, flowchart 480 further includes obtaining the digital asset, the digital asset including an endorsement in the form of a cryptographically unique identifier referencing a public key corresponding to the private key, the public key associated with a public persona of endorser(s) 120/320 (action 482). As noted above, examples of such a cryptographically unique identifier may include a digital signature or a digital representation of a trademark, logo, or brand. Action 482 may be performed by digital asset management software code 118, executed by hardware processor 114 of system 110/210/310.

As noted above, system 110/210/310 may be adapted to serve as a standardized universal asset library, which may be decentralized or distributed. In those implementations, system 110/210/310, functioning as an open exchange, may be configured to verify the authenticity of a 2D or 3D digital asset owned by endorser(s) 120/320 of the digital asset, such as an advertiser or content creator, and available from system 110/310, by requiring a signed edition of the digital asset (e.g., endorsed NFT 122). That signed edition of the digital asset may be produced by reference to a digital wallet linked to a public persona of each of endorser(s) 120/320, such as a respective verified social media profile of each of endorser(s) 120/320 for example. In various implementations, endorser(s) 120/320 may be one or more persons or one or more business entities.

Continuing to refer to FIG. 4 in combination with FIGS. 1, 2, 3A, and 3B, flowchart 480 further includes verifying, using the public key associated with the public persona of endorser(s) 120/320, the present ownership of the right to the digital asset (action 483). It is noted that in implementations in which the digital asset has a plurality of individual endorsers, the digital asset is produced using a private key of each of those plurality of individual endorsers. In those implementations, the digital asset is produced so as to include a plurality of cryptographically unique identifiers referencing respective public keys corresponding to the plurality of private keys, the public keys being associated with respective public personas of the plurality of individual endorsers. Action 483 may be performed in action 483 by digital asset management software code 118, executed by hardware processor 114 of system 110/210/310, and using secure transaction ledger 106.

Continuing to refer to FIG. 4 in combination with FIGS. 1, 2, 3A, and 3B, in some implementations, flowchart 480 further includes generating, in response to verifying the present ownership of the digital asset, a smart contract, such as smart sales contract 370 for example, governing the exercise of the one or more rights associated with the digital asset, e.g., endorsed NFT 122 (action 484). For example, smart sales contract 370 may specify the permissible use or uses of the digital asset, a time interval during which the usage rights are in effect, and fees or royalties associated with each use, such as fees or royalties based on a rate card for instance.

It is noted that action 484 is optional, and in some implementations, the smart contract governing the exercise of the one or more rights associated with the digital asset, e.g., endorsed NFT 122, may already exist. When included in the method outlined by flowchart 480, action 484 may be performed by digital asset management software code 118, executed by hardware processor 114 of system 110/210/310.

Continuing to refer to FIG. 4 in combination with FIGS. 1, 2, 3A, and 3B, flowchart 480 further includes tracking each of the exercises of the one or more rights associated with the digital asset (action 485). It is noted that in implementations in which optional action 484 is omitted from the method outlined by flowchart 480, the tracking performed in action 485 is in response to verifying the present ownership of the right to the digital asset, in action 483. Action 485 may be performed by digital asset management software code 118, executed by hardware processor 114 of system 110/210/310. By way of example, advertisers might be prepared to pay for their digital assets to be used in media exposed to consumers, while content creators might charge to license use of digital assets they create.

Continuing to refer to FIG. 4 in combination with FIGS. 1, 2, 3A, and 3B, flowchart 480 further identifying, based on a smart contract governing the exercise of the one or more rights associated with the digital asset, e.g., the smart contract generated in action 484 or a preexisting smart contract, a respective fee for each tracked exercise of the one or more rights associated with the digital asset (action 486). Action 486 may be performed by digital asset management software code 118, executed by hardware processor 114 of system 110/210/310.

In some implementations, the method outlined by flowchart 480 may conclude with action 486 described above. However, continuing to refer to FIG. 4 in combination with FIGS. 1, 2, 3A, and 3B, in other implementations flowchart 480 may further include collecting the respective fee for each tracked exercise of the one or more rights associated with the digital asset (action 487), and distributing to endorser(s) 120/320, based on the smart contract, at least a portion of the collected respective fee for each of the tracked exercises of the one or more rights associated with the digital asset (action 488). When included in the method outlined by flowchart 480, actions 487 and 488 may be performed by digital asset management software code 118, executed by hardware processor 114 of system 110/210/310.

As noted above, one significant advantage provided by the use of system 110/210/310 as a standardized universal asset library is automation of the identification, collection, and distribution of payments, fees, and royalties based on usage by confirming that a digital asset was displayed, sold, or otherwise utilized, while validating to consumers and other stakeholders that the digital asset is authentic, without requiring centralized or human oversight.

That is to say, the actions described by flowchart 480 may advantageously be performed by system 100 as an automated process. As defined in the present application, the term "automated," refers to systems and processes that do not require the participation of a human user, such as a human system administrator. For example, although in some implementations a human system administrator may review the performance of the systems and methods disclosed herein, and, in some cases may adjust their performance over time, that human involvement is optional. Thus, in some implementations, the process described by flowchart 480 may be performed under the control of hardware processing components of system 100.

Thus, the present application discloses systems and methods for coordinating and managing NFT endorsements that address and overcome the deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system comprising:
a hardware processor; and
a system memory storing a software code;
the hardware processor configured to execute the software code to:
    receive a request to track exercises of one or more rights associated with an endorsed digital asset produced by adding an endorsement in the form of a cryptographically unique identifier to an existing digital asset using a private key of an endorser of the endorsed digital asset;
    obtain the endorsed digital asset, the cryptographically unique identifier being at least one of a digital representation of a trademark, a logo, or a brand, the cryptographically unique identifier referencing a public key corresponding to the private key, the public key associated with a public persona of the endorser, wherein authenticity of the cryptographically unique identifier is verifiable using the public persona of the endorser;
    obtain the public key referenced by the cryptographically unique identifier;
    verify, using a blockchain, and the public key referenced by the cryptographically unique identifier, a present ownership of the endorsed digital asset;
    track, in response to verifying, each of the exercises of the one or more rights associated with the endorsed digital asset;
    identify, based on a smart contract governing the exercises of the one or more rights associated with the endorsed digital asset, a respective fee for each of the tracked exercises of the one or more rights associated with the endorsed digital asset; and
    collect the respective fee for each of the tracked exercises of the one or more rights associated with the endorsed digital asset.

2. The system of claim 1, wherein the existing digital asset comprises a non-fungible token (NFT).

3. The system of claim 1, wherein the endorser comprises a celebrity, an athlete, a business entity, or a fictional persona.

4. The system of claim 1, wherein the public persona comprises a social media profile of the endorser.

5. The system of claim 1, wherein the hardware processor is further configured to execute the software code to:
    generate the smart contract governing the exercises of the one or more rights associated with the endorsed digital asset.

6. The system of claim 1, wherein the hardware processor is further configured to execute the software code to:
    distribute to the endorser, based on the smart contract, at least a portion of the collected respective fee for each of the tracked exercises of the one or more rights associated with the endorsed digital asset.

7. The system of claim 1, wherein the endorser comprises a plurality of individual endorsers, and wherein the endorsed digital asset is produced using a private key of each of the plurality of individual endorsers of the endorsed digital asset, and wherein the endorsed digital asset includes a plurality of cryptographically unique identifiers referencing respective public keys corresponding to the plurality of private keys, the public keys associated with respective public personas of the plurality of individual endorsers.

8. A method for use by a system including a hardware processor and a system memory storing a software code, the method comprising:
    receiving, by the software code executed by the hardware processor, a request to track exercises of one or more rights associated with an endorsed digital asset produced by adding an endorsement in the form of a cryptographically unique identifier to an existing digital asset using a private key of an endorser of the endorsed digital asset;
    obtaining the endorsed digital asset, by the software code executed by the hardware processor, the cryptographically unique identifier being at least one of a digital representation of a trademark, a logo, or a brand, the cryptographically unique identifier referencing a public key corresponding to the private key, the public key associated with a public persona of the endorser, wherein authenticity of the cryptographically unique identifier is verifiable using the public persona of the endorser;
    obtaining, by the software code executed by the hardware processor, the public key referenced by the cryptographically unique identifier;
    verifying, by the software code executed by the hardware processor and using a block chain and the public key referenced by the cryptographically unique identifier, a present ownership of the endorsed digital asset;
    tracking, by the software code executed by the hardware processor, in response to verifying, each of the exercises of the one or more rights associated with the endorsed digital asset;
    identifying, by the software code executed by the hardware processor based on a smart contract governing the exercises of the one or more rights associated with the endorsed digital asset, a respective fee for each of the tracked exercises of the one or more rights associated with the endorsed digital asset; and
    collecting, by the software code executed by the hardware processor based on the smart contract, the respective fee for each of the tracked exercises of the one or more rights associated with the endorsed digital asset.

9. The method of claim 8, wherein the existing digital asset comprises a non-fungible token (NFT).

10. The method of claim 8, wherein the endorser comprises a celebrity, an athlete, a business entity, or a fictional persona.

11. The method of claim 8, wherein the public persona comprises a social media profile of the endorser.

12. The method of claim 8, further comprising:

generating, by software code executed by the hardware processor, the smart contract governing the exercises of the one or more rights associated with the endorsed digital asset.

13. The method of claim 8, further comprising:

distributing to the endorser, by the software code executed by the hardware processor based on the smart contract, at least a portion of the collected respective fee for each of the tracked exercises of the one or more rights associated with the endorsed digital asset.

14. The method of claim 8, wherein the endorser comprises a plurality of individual endorsers, and wherein the endorsed digital asset is produced using a private key of each of the plurality of individual endorsers of the endorsed digital asset, and wherein the endorsed digital asset includes a plurality of cryptographically unique identifiers referencing respective public keys corresponding to the plurality of private keys, the public keys associated with respective public personas of the plurality of individual endorsers.

15. A computer-readable non-transitory storage medium having stored thereon a software code, which when executed by a hardware processor, instantiates a method comprising:

receiving a request to track exercises of one or more rights associated with an endorsed digital asset produced by adding an endorsement in the form of a cryptographically unique identifier to an existing digital asset using a private key of an endorser of the endorsed digital asset;

obtaining the endorsed digital asset, the cryptographically unique identifier being at least one of a digital representation of a trademark, a logo, or a brand, the cryptographically unique identifier referencing a public key corresponding to the private key, the public key associated with a public persona of the endorser, wherein authenticity of the cryptographically unique identifier is verifiable using the public persona of the endorser;

obtain the public key referenced by the cryptographically unique identifier;

verifying, using a block chain and the public key referenced by the cryptographically unique identifier, a present ownership of the endorsed digital asset;

tracking, in response to verifying, each of the exercises of the one or more rights associated with the endorsed digital asset;

identifying, based on a smart contract governing the exercises of the one or more rights associated with the endorsed digital asset, a respective fee for each of the tracked exercises of the one or more rights associated with the endorsed digital asset; and collecting the respective fee for each of the tracked exercises of the one or more rights associated with the endorsed digital asset.

16. The computer-readable non-transitory storage medium of claim 15, wherein the existing digital asset comprises a non-fungible token (NFT).

17. The computer-readable non-transitory storage medium of claim 15, wherein the endorser comprises a celebrity, an athlete, a business entity, or a fictional persona, and wherein the public persona comprises a social media profile of the endorser.

18. The computer-readable non-transitory storage medium of claim 15, the method further comprising:

generating the smart contract governing the exercises of the one or more rights associated with the endorsed digital asset.

19. The computer-readable non-transitory storage medium of claim 15, further comprising:

distributing to the endorser, based on the smart contract, at least a portion of the collected respective fee for each of the tracked exercises of the one or more rights associated with the endorsed digital asset.

20. The computer-readable non-transitory storage medium of claim 19, wherein the endorser comprises a plurality of individual endorsers, and wherein the endorsed digital asset is produced using a private key of each of the plurality of individual endorsers of the endorsed digital asset, and wherein the endorsed digital asset includes a plurality of cryptographically unique identifiers referencing respective public keys corresponding to the plurality of private keys, the public keys associated with respective public personas of the plurality of individual endorsers.

* * * * *